US005514395A

United States Patent [19]

Burger

[11] Patent Number: 5,514,395
[45] Date of Patent: * May 7, 1996

[54] FILLED BAGEL DOUGH PRODUCT AND METHOD

[76] Inventor: Alvin Burger, 7876 SW. 89th La., Miami, Fla. 33156-7570

[*] Notice: The portion of the term of this patent subsequent to Aug. 17, 2010, has been disclaimed.

[21] Appl. No.: 106,763

[22] Filed: Aug. 16, 1993

Related U.S. Application Data

[63] Continuation of Ser. No. 816,010, Dec. 31, 1991, Pat. No. 5,236,724.

[51] Int. Cl.$^6$ .............................. A21D 10/00; A23D 1/08
[52] U.S. Cl. .................. 426/94; 426/19; 426/21; 426/449; 426/549
[58] Field of Search .................. 426/94, 19, 21, 426/549, 499

[56] References Cited

U.S. PATENT DOCUMENTS

| | | | |
|---|---|---|---|
| 1,802,698 | 4/1931 | Blanchard | 426/138 |
| 3,572,259 | 3/1971 | Hayashi | 107/68 |
| 4,251,201 | 2/1981 | Krysiak | 425/132 |
| 4,334,464 | 6/1982 | Shinriki | 99/450.6 |
| 4,446,160 | 5/1984 | Shinriki | 426/297 |
| 4,515,819 | 5/1985 | Shinriki | 426/297 |
| 4,657,769 | 4/1987 | Petrofsky et al. | 426/653 |
| 4,693,899 | 9/1987 | Hong et al. | 426/94 |
| 4,794,009 | 12/1988 | Dreisin | 426/283 |
| 4,882,185 | 11/1989 | Simelunas et al. | 426/283 |
| 4,929,464 | 5/1990 | Willyard et al. | 426/499 |

OTHER PUBLICATIONS

C. Berman and S. Munshower, Bagelmania—The "Hole" Story (HP Books, 1987), pp. 10–13, 17, 19–22, 56–57.
Better Homes and Gardens New Cook Book (Meridith Corporation, 1989), p. 52.
Kinderlehrer, J., Cooking Kosher: The Natural Way (Jonathan David Publishers, 1980), pp. 245–248.
Zeidler, J., The Gourmet Jewish Cook (William Morrow and Company, Inc., 1988), pp. 382–384, 393.
The Laurel's Kitchen Bread Book (Random House, New York) 1984, p. 264.
Petrofsky, "Bagel Production and Technology", AIB Research Dept. Technical Bulletin, V. VIII, Issue 11, Nov. 1986.
Meloan and Doerry, "Update on Bagel Technology" AIB Research Dept. Technical Bulletin, vol. X, Issue 4, Apr. 1988.
Matz, Formulas and Processes for Bakers; 1987, Pan Tech International, Inc. pp. 240–241.

*Primary Examiner*—Jeanette Hunter
*Assistant Examiner*—Mary S. Mims
*Attorney, Agent, or Firm*—Warren L. Franz

[57] ABSTRACT

A filled bagel dough product has a hollow spherical shell filled with cream cheese. The dough is formed into an open ball, which is sealed after insertion of a scoop of cream cheese. The filled ball is steamed to skin outer and inner crusts, then baked to provide a dense crumb. The resulting product is freezable for long shelf-life.

10 Claims, 1 Drawing Sheet

FILLED BAGEL DOUGH PRODUCT AND METHOD

FILLED BAGEL DOUGH PRODUCT AND METHOD

This is a continuation of U.S. Ser. No. 07/816,010, filed Dec. 31, 1991, entitled "Filled Bagel Dough Product and Method," now U.S. Pat. No. 5,236,724.

BACKGROUND OF THE INVENTION

This patent relates to a filled bagel dough product, and to a method for making the same, and, in particular, to a hollow ball-shaped bagel dough product, prefilled with cream cheese.

Bagels are made by a process which creates a doughnut or toroidal shaped bakery product having a hard outer crust with a distinctive "bagel" taste. Such products are characteristically cut open by slicing them across their width on a plane perpendicular to the axis of the toroid, and spreading cream cheese or the like on them. Because of the hard crust, the cutting process requires a sharp knife which can be hazardous. Avoidance of use of a knife can be done by, instead, tearing the product in half with the hands. Such maneuver is usually awkward and does not result in the desired planar cut. Spreading the cream cheese on the sliced bagel can be tedious, especially when the cheese is cold and has been stored in a refrigerator.

The term "bagel" comes from the Yiddish word "beigen," which means to "bend," and is used to describe a ring-shaped dense, heavy bread roll having a smooth, sleek outer crust and a compact inner crumb. A bagel is made from a yeast dough, which is first boiled in water to close the pores of the dough, then baked in a hot oven to turn the crust golden brown. The dough is worked on a flour board and set in a warm place to rise, then kneaded again before being formed into rings. The rings are formed from balls of the risen dough, either by poking a hole through the center of each ball or by rolling each ball into a long strip, shaping it into a ring and then pressing the ends together. A favorite way of enjoying bagels is to slice them in half, and spread cream cheese on them.

The invention departs from the traditional bagel-making process in that, instead of forming the dough into rings, it is formed into hollow balls with the tops left open. Cream cheese is then put into the hollow center and the ball is closed. The filled balls are then steamed, rather than boiled, and subsequently baked. The resulting product offers the good taste of a bagel, together with the convenience of having the cream cheese already in place.

Bakery products comprising a hollow bread dough, filled with an edible filler are, in general, already known. Familiar examples include jam balls, filled doughnuts and meat-filled dough products. Blanchard U.S. Pat. No. 1,802,698 describes a ring-shaped flour batter confection having an edible filling such as ice cream or whipped cream. Krysiak U.S. Pat. No. 4,251,201 (see FIG. 11) shows apparatus for the preparation of a filled pretzel.

Various ways of automatically filling a dough shell prior to cooking or baking are known. In a typical such procedure, as exemplified by Shinriki U.S. Pat. Nos. 4,334,464, 4,446,160 and 4,515,819, a ball-shaped encrusted bakery product (see FIG. 11 of the '819 patent) is automatically formed by depositing a ball of sticky edible paste material (viz. jam) onto a starch film. Thereafter, a dough sheet is gathered around the ball to enclose it with dough before cooking. In Hayashi U.S. Pat. No. 3,572,259, a vertical tubular extrusion of bread dough crust material and jam or cream core material is cut and formed into two-layered balls without exposure of the core material. Other methods of producing filled dough products are described in U.S. Pat. Nos. 4,794,009 and 4,882,185.

None of the prior art patents, however, mentions the use of cream cheese as a filler, nor describes preparation of the dough skin or crust using a bagel-making technique, i.e., boiling or steaming, followed by baking.

SUMMARY OF THE INVENTION

In accordance with the invention, a filled bagel dough product comprises a hollow spherical ball of stiff, high gluten yeast dough prepared to have the distinctive bagel texture and taste, and having a hollow center incorporating a predeposited quantity of cream cheese. The dough balls are made by hand or machine, with the edges brought up and sealed around a scoop of cream cheese inserted in the hollow center. The filled balls are steamed for ten minutes in a precooking step to provide a wet crust and are subsequently taken to a hot oven for 12 minutes for baking. The resulting product is a cream cheese-filled bagel dough product which provides enjoyment of the distinctive bagel and cream cheese taste, with no requirement for cutting or spreading the cheese. The method of the invention enables freezing the product, including the cream cheese, for extended periods with no deterioration in quality.

BRIEF DESCRIPTION OF THE DRAWINGS

Embodiments of the invention have been chosen for purposes of illustration and description below, with reference to the accompanying drawings, wherein.

Throughout the drawings, like elements are referred to by like numerals.

DETAILED DESCRIPTION OF PREFERRED EMBODIMENTS

Figure 1:
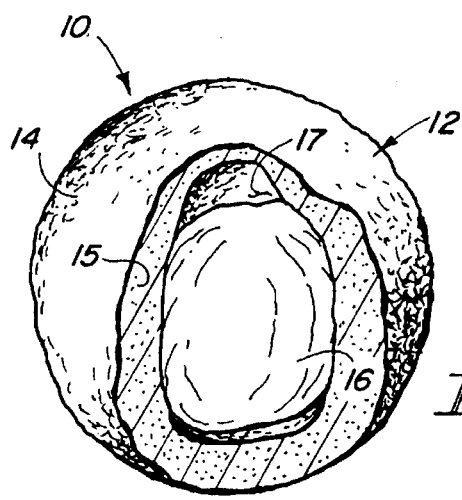
FIG. 1 is a cutaway perspective view of a filled bagel dough product in accordance with the product of the invention.

A preferred form of the product of the invention, shown in FIG. 1, is made according to a preferred method of the invention, described with reference to FIGS. 2A–2D. The method can be performed by hand, or can be performed in an automated fashion, using suitable extrusion and other machinery.

The term "bagel dough" as used herein refers to a very stiff, high protein dough, such as known to make bagels using conventional bagel-making techniques. Such dough is not unlike a lean french bread dough. It is firm to the touch and easily rolled on a floured surface. The dough comprises a mixture of flour, water, salt, yeast, and sometimes sugar. The flour should be a high gluten flour, such as a good clear spring wheat flour with protein content of typically 13.5–14% of flour weight. Water should be added in a quantity of typically 50–53% of flour weight. Salt content should typically be 1.5–2.2% of flour weight. Yeast should be added in a quantity of typically 0.5–2% of flour weight. Sugar, which serves as a food for the yeast and not as a contributor to the final product, should be a dextrose, corn syrup, high fructose or other fermentable sugar, and can be added to typically 0–4% of flour weight. Residual sugar contributes to the browning of the crust during baking.

As shown in FIG. 1, a product 10 in accordance with the invention comprises a hollow ball 12 of steamed and cooked bagel dough having an outer crust 14 and an inner crumb 15, surrounding a quantity of cream cheese 16 sealed within the hollow 17 formed in the dough. The product 10 can be either made by hand or through an automated process.

Figure 2A:
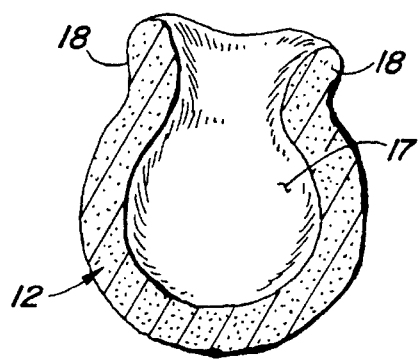
FIGS. 2A–2D are sequential views showing steps in accordance with the method of the invention.
Figure 2B:
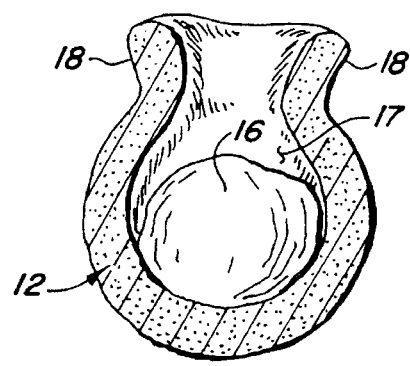
Figure 2C:
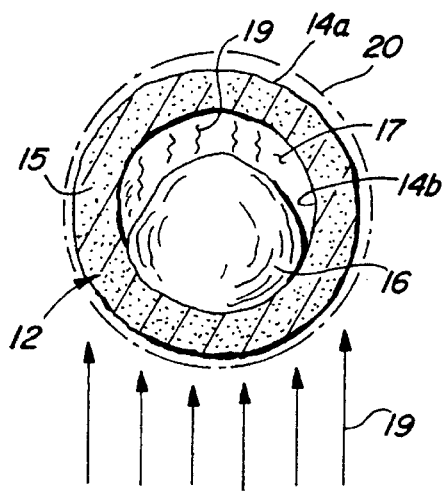
Figure 2D:
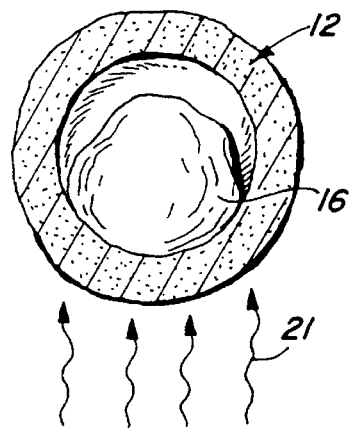

In accordance with a method of making the product 10, shown in FIGS. 2A–2D, a quantity of bagel dough is mixed, kneaded to develop the gluten, and then shaped into a round ball 12, about the size of a golf ball, with a hollow center. The sides 18 are brought up and the ball 12 left open at the top (FIG. 2A). A scoop 16 of solid cream cheese, preferably block cream cheese such as Philadelphia™ brand cheese at 40°–60° F., is inserted into the hollow 17 (FIG. 2B), and the dough ball top is closed to hermetically seal the cream cheese 16 within the dough ball 12. The closed and filled ball 12 is then placed in a warm cabinet, unheated oven (80°–85° F.) or the like, to proof for 20–30 minutes, permitting the yeast to act to raise the dough. The product is then placed in a steamer for 10 minutes to enable the hot steam 19 (FIG. 2C) to set the yeast of the crust 14 sufficiently to skin the outside crust 14a. The cheese 16 within the hollow 17 contributes to this step, providing steam 19 in the hollow 17 which also skins the inside crust 14b of the hollow dough ball 12. During the steaming step, the ball is supported in a porous mold 20, to shape it so that is does not fall apart. Finally, the steamed ball 12 is baked in an oven to apply heat 21 for 12 minutes, enabling fermentation to continue within the crumb 15 to reduce the cell size of gas cells in the annular interior of the baked dough ball 12, between the crusts 14a, 14b. The finished dough texture becomes compacted, since the crusts 14a, 14b have already been set in the steaming step. The product 10 may be frozen, either prior to the baking stage, or after full or partial baking. The product may be freezer-stored for up to one year without deterioration. The product may be refrigerated without deterioration for about one month.

The process of the invention produces a freezable, cream cheese-filled bagel product which is extremely tasty and, with reheating, provides the same enjoyment as conventional heated bagels which are cut open and filled with cream cheese.

Normally, solid cream cheese cannot be freezer stored, because uncooked cream cheese curdles. The step of steaming the cheese-filled dough ball 12, however, acts chemically to enable the cheese 16 to be frozen, together with the bagel shell 12, so that the texture of the cheese 16, upon reheating, is the same as if it had never been frozen. Thus, not only does the process of the invention provide a novel bakery product that provides both bagel and cream cheese in a conveniently packaged, preprepared combination, but it enables lengthening of the cream cheese shelf-life over what would normally be available for separately sold bagels and cream cheese. The dough ball, in addition to being filled with cream cheese, may also be filled with other traditional bagel topping, such as onions, poppy seeds, or lox. The surface may be shined or glazed, if desired, with an egg or other wash.

Those skilled in the art to which the invention relates will appreciate that other substitutions and modifications can be made to the described embodiment without departing from the spirit and scope of the invention as described by the claims below.

What is claimed is:

1. A process of making a filled bagel dough product, comprising the steps of:

mixing and kneading a quantity of bagel dough to develop gluten;

shaping the quantity of kneaded dough into a hollow ball, leaving an opening into the hollow;

inserting a scoop of cream cheese into the hollow through the opening;

closing the opening to seal the scoop of cream cheese within the dough ball;

proofing the closed and cheese-filled ball to activate yeast to raise the dough through fermentation;

setting yeast on the raised dough ball exterior to skin an outside crust;

setting yeast on the raised dough ball interior to skin an inside crust; and baking the skinned crust ball, enabling fermentation to continue, until a compact dough crumb is defined between the crusts.

2. A process as defined in claim 1 wherein, in said shaping step, said kneaded dough is shaped into a round ball.

3. A process as defined in claim 2 wherein said round ball is about the size of a golf ball.

4. A process as defined in claim 1 wherein, in said inserting step, said cream cheese is a solid block cream cheese.

5. A process as defined in claim 4 wherein said cream cheese is at 40°–60° F.

6. A process as defined in claim 1 wherein, in said proofing step, said ball is placed at a temperature of 80°–85° F. for 20–30 minutes.

7. A process as defined in claim 1 wherein, in said ball exterior yeast setting step, said ball exterior yeast is set by steam.

8. A process as defined in claim 7 wherein, in said ball yeast exterior yeast setting step, said ball is supported in a porous mold in a steamer.

9. A process as defined in claim 1, further comprising a step of also inserting at least one of onions, poppy seeds or lox into the hollow through the opening.

10. A process as defined in claim 1, further comprising a step of glazing the dough ball exterior with an egg wash.

\* \* \* \* \*